United States Patent [19]

Usui

[11] 4,080,141
[45] Mar. 21, 1978

[54] APPARATUS FOR PRODUCING BENT PIPE OF REINFORCED SYNTHETIC RESIN

[76] Inventor: Fumio Usui, 441, Shimofusa, Tama, Kawasaki, Kanagawa, Japan

[21] Appl. No.: 717,560

[22] Filed: Aug. 25, 1976

[30] Foreign Application Priority Data

Sep. 5, 1975 Japan ............................ 50-107866

[51] Int. Cl.² ............................................. B29C 17/00
[52] U.S. Cl. ................................... 425/393; 425/390
[58] Field of Search ...... 425/390, 392, 393, DIG. 218; 249/183

[56] References Cited

U.S. PATENT DOCUMENTS

| | | | |
|---|---|---|---|
| 3,753,635 | 8/1973 | Barnett | 425/392 X |
| 3,890,079 | 6/1975 | Slater | 425/393 X |
| 3,922,134 | 11/1975 | Kupfrion | 425/393 X |
| 4,009,982 | 3/1977 | Maier | 425/393 X |

*Primary Examiner*—J. Howard Flint, Jr.
*Attorney, Agent, or Firm*—Wenderoth, Lind & Ponack

[57] ABSTRACT

A bent pipe of reinforced synthetic resin is produced by supporting a flexible and elastic tubular mandrel in a stiff and straight position, forming layers of fiber impregnated with thermo-hardening synthetic resin about the mandrel, releasing the mandrel from the straightly stiffened position, bending the mandrel in the desired curvature, heat hardening the synthetic resin, and then extracting the mandrel from the bent pipe thus formed and hardened.

12 Claims, 36 Drawing Figures

APPARATUS FOR PRODUCING BENT PIPE OF REINFORCED SYNTHETIC RESIN

BACKGROUND OF THE INVENTION

The present invention relates to an apparatus for producing a bent pipe of synthetic resin (FRP) reinforced with glass fiber or the like.

Bent pipes are used at corners of surface or underground pipelines for various fluids. Bent pipes are generally more difficult to produce than straight pipes. Particularly, bent pipes of synthetic resin (FRP) reinforced with glass fiber or the like has been extremely difficult and no satisfactory result has been achieved yet.

Accordingly, the object of the present invention is to provide apparatus for producing a bent pipe of reinforced synthetic resin which are relatively simple and adapted for mass production.

SUMMARY OF THE INVENTION

The method for producing a bent pipe of reinforced synthetic resin using the apparatus of the present invention comprises the steps of:
1. preparing a flexible and elastic tubular mandrel of the prescribed dimension;
2. supporting the mandrel in a stiff and straight position;
3. forming layers of fiber impregnated with thermo-hardening synthetic resin on the mandrel;
4. releasing the mandrel from the straight stiffened position;
5. bending the mandrel with the fiber layers thereon in the desired curvature;
6. heat-hardening the synthetic resin maintaining the mandrel in the bent position; and
7. extracting the mandrel from the bent pipe thus formed and hardened.

An apparatus for producing a bent pipe of reinforced synthetic resin according to one aspect of the present invention is designed to utilize a fluid to straight stiffen the mandrel and comprises a mandrel, a set of chuck mechanisms, a rotary drive unit, a source of supply of fluid, and a mandrel bending mechanism.

The mandrel is formed of an elastic material into a tubular body. An embodiment of the mandrel is provided internally at opposite ends with partitions for defining a space for containing the fluid therein. Another embodiment of the mandrel has a plurality of axially extending long holes spaced circumferentially from each other for containing the fluid therein. A further embodiment of the mandrel has a helically extending bent hole for containing the fluid therein. A still further embodiment of the mandrel has reinforcing rings internally and/or externally at the opposite ends thereof.

A set of the chuck mechanisms are capable of holding fluid-sealably the opposite ends of the mandrel and are mounted on a bed so as to be slidable axially and pivotable perpendicularly to the axial direction.

The rotary drive unit is removably connected to one of said chuck mechanisms to rotary drive it.

The source of supply of the fluid supplies the fluid under pressure to the inside of the mandrel through said chuck mechanisms.

The mandrel bending mechanism is provided with a pusher mold and a receiver mold opposed to each other in a plane including the axis of the mandrel and a line perpendicular to said axis and with said axis therebetween. Said pusher and receiver molds are complementary halves of a configuration identical to that of the bent pipe to be produced. The mandrel is held between said pusher and receiver molds and is bent.

An apparatus for producing a bent pipe of reinforced synthetic resin according to another aspect of the present invention is designed to utilize an expanding mechanism to straight stiffen the mandrel and comprises a mandrel, a set of chuck units, and a bending mechanism.

The mandrel is formed of an elastic material into a tubular body.

A set of the chuck units are provided with a chuck mechanism for holding opposite ends of the mandrel and an expanding mechanism adapted to be inserted into the mandrel for pressing and supporting the inner surface of the mandrel. Said units are mounted on a bed so as to be slidable axially and pivotable perpendicularly to the axial direction. The expanding mechanism of the chuck units may utilize an air shaft. Another embodiment of the expanding mechanism may take the construction in which a threaded shaft is inserted into a pipe, said shaft is supported within said pipe by a nut, an end of a rocking link is connected to said pipe and nut, and the other end of said rocking link is connected to a pusher plate so that said pusher plate is moved radially by rotating said shaft.

The bending mechanism causes said set of chuck units to slide axially and to pivotally move vertically.

The bending mechanism may be constructed to connect said set of chuck units to each other so as to cause the chuck units to slide over the equal lengths in the opposite directions and to pivotally move them over the equal lengths in the vertically opposite directions.

The bending mechanism may include the mandrel bending mechanism described hereinabove.

A further form of the bending mechanism may be constructed so as to cause said set of chuck units to slide independently in the axial directions and also to pivotally move in the vertical directions.

This form of the bending mechanism may include the mandrel bending mechanism described hereinabove.

BRIEF DESCRIPTION OF THE DRAWINGS:

The invention will be better understood from the following description taken in connection with the accompanying drawings in which:

FIGS. 16 are schematic illustrations of an embodiment of the apparatus for practicing the method according to the present invention, in which

FIGS. 17 are schematic illustrations of another embodiment of the apparatus according to the present invention, in which

FIGS. 19 show an apparatus similar to that of FIG. 17, in which

DESCRIPTION OF THE PREFERRED EMBODIMENTS

Figure 1A:
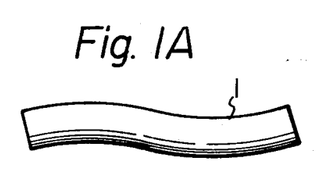
FIGS. 1A to 1G are schematic illustrations of the process of the producing method according to the present invention.
Figure 1B:
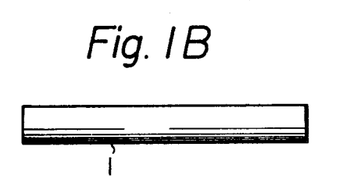
Figure 1C:
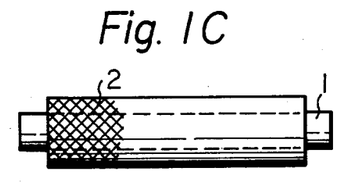
Figure 1D:
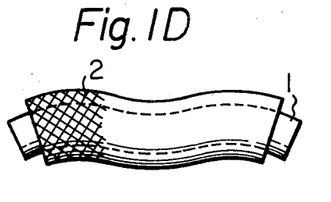
Figure 1E:
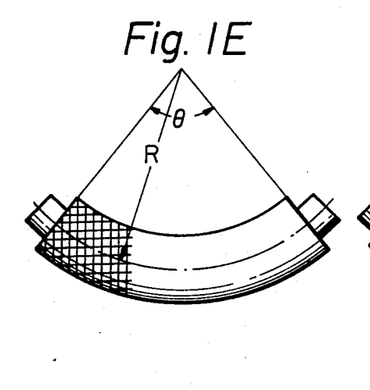
Figure 1F:
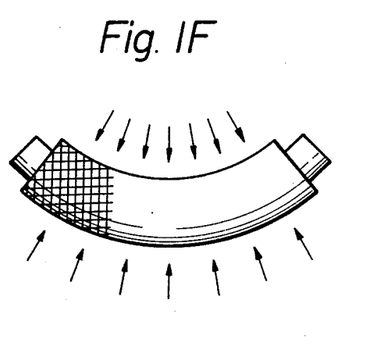
Figure 1G:
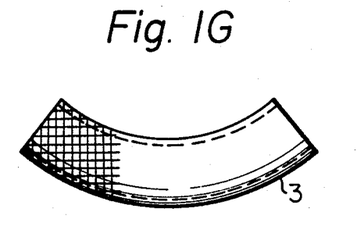

Referring now to the drawings the apparatus of the present invention will be described. As shown in FIGS. 1A to 1G, the method for producing a bent pipe of reinforced synthetic resin (FRP) using the apparatus of the present invention, as mentioned above, comprises the steps of:

1. preparing a flexible and elastic tubular mandrel of prescribed dimension (FIG. 1A);
2. supporting the mandrel 1 in a stiff and straight position (FIG. 1B);
3. forming layers of fiber 2 impregnated with a thermo-hardening synthetic resin on the mandrel 1 (FIG. 1C);
4. releasing the mandrel 1 from the straight stiffened position (FIG. 1D);
5. bending the mandrel 1 with the fiber layers 2 thereon in the desired curvature (radius R, angle θ) (FIG. 1E);
6. heat-hardening the synthetic resin maintaining the mandrel 1 in the bent position (FIG. 1F); and
7. extracting the mandrel 1 from the bent pipe 3 thus formed and hardened (FIG. 1G).

Besides these steps, when necessary, a pipe end processing step may be added. For example, when it is necessary to provide threaded portions at pipe ends, the pipe ends are required to be threaded with dies before the synthetic resin is hardened and preferably subsequently to the step (3) above. Alternatively when it is necessary to provide expanded or reduced sockets at pipe ends, it is required to provide beforehand expanded or reduced portions at desired positions of the mandrel.

Figure 2:
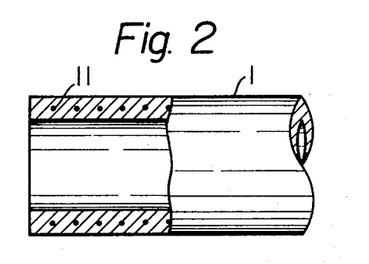
FIG. 2 is a partially broken away side view of a mandrel for use in the method according to the present invention.

FIGS. 2 to 9 show various forms of the tubular mandrel, namely the flexible and elastic long tubular mandrel of the required dimension, to be prepared in the step (1) above. The mandrel 1 shown in FIG. 2 is made, for example, of rubber (silicon rubber, neoprene, and the like are particularly suitable because of their good mold releasability), synthetic resin, rubber-coated fabric, and the like formed into a tubular body having reinforcing metallic wires 11 such, for example, as piano wires, embedded helically therein. However, the mandrel for a bent pipe of small diameter may be formed without any reinforcing metallic wire. The mandrel 1 may take any outer configuration as required such, for example, as a right cylinder, circular truncated cone, polygonal prism, polygonal truncated pyramid, and the like.

Figure 3:
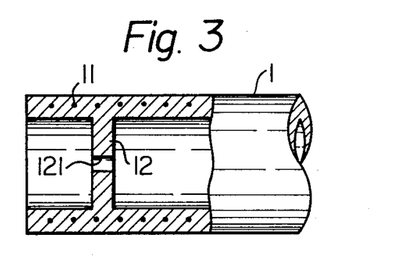
FIG. 3 is a partially broken away side view of another mandrel.
Figure 4:
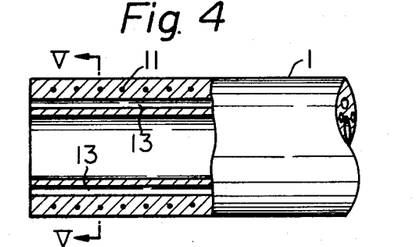
FIG. 4 is a partially broken away side view of still another mandrel.
Figure 5:
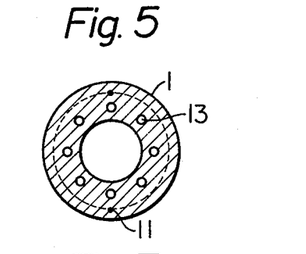
FIG. 5 is a cross-sectional view taken along the line V—V of FIG. 4.
Figure 6:
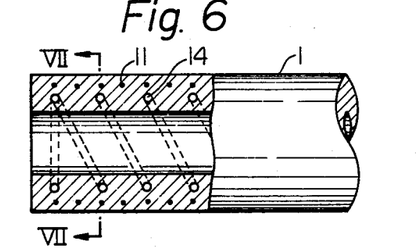
FIG. 6 is a partially broken away side view of still another mandrel.
Figure 7:
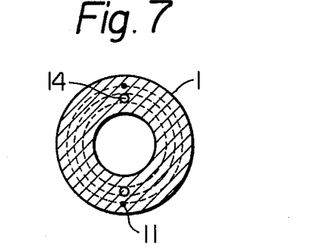
FIG. 7 is a cross-sectional view taken along the line VII—VII of FIG. 6.

The mandrel 1 is preferably provided with a special construction in the step (2) as will be described hereinunder. For example, as shown in FIG. 3, the mandrel 1 is provided at opposite ends with partitions 12 (FIG. 3 shows only the left-hand end of the mandrel) having a hole 121 through which air, water or other fluid is forced into an internal cavity to stiffen the mandrel 1 straight. Alternatively, as shown in FIGS. 4 and 5, the mandrel 1 has a plurality of axially extending long holes 13 spaced circumferentially from each other in the tubular body, or as shown in FIGS. 6 and 7 the mandrel 1 has a helically bent hole 14 extending circumferentially of the tubular body, so that air, water or other fluid is forced through the long holes 13 or the bent hole 14 into the internal cavity to straightly stiffen the mandrel 1.

Figure 8:
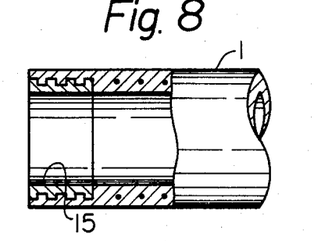
FIGS. 8 and 9 are partially broken away side views showing the constructions of reinforced ends of the mandrel.
Figure 9:
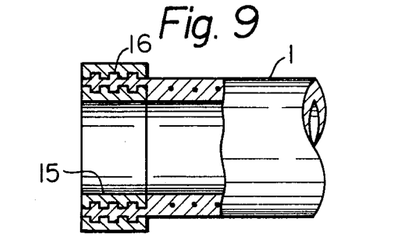

To facilitate support by chuck and the like, the mandrel 1 is, as shown in FIGS. 8 and 9, preferably provided at opposite ends internally and/or externally with reinforcing rings 15 and/or 16 of metal and the like which are bonded or embedded. Provision of taper in the inside or outside surfaces of the reinforcing rings 15 or 16 is particularly effective for holding by tapered jaw chucks to be described in fuller detail hereinunder.

Figure 10A:
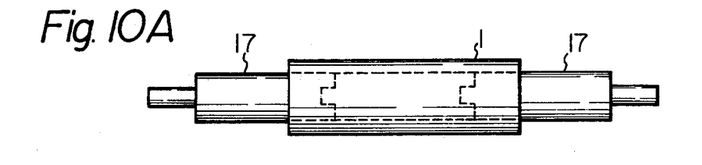
FIGS. 10A, 10B and 11 are schematic views showing stiffening support means of the mandrel.
Figure 10B:
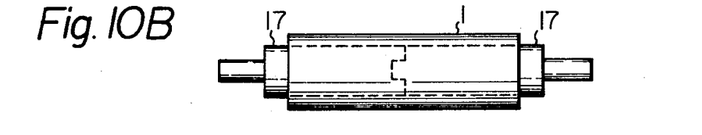
Figure 11:
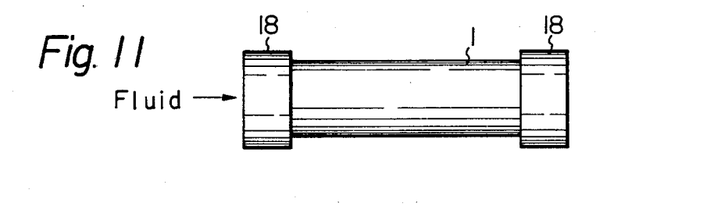
Figure 12A:
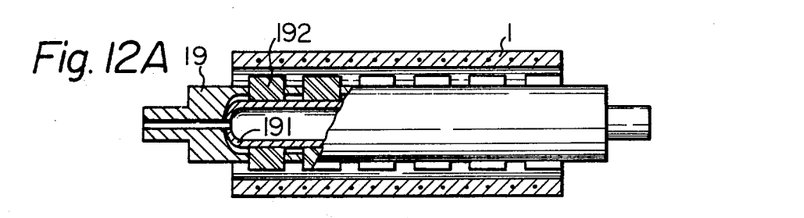
FIGS. 12A and 12B are partially broken away side views of air shafts for use in the stiffening support means of the mandrel.
Figure 12B:
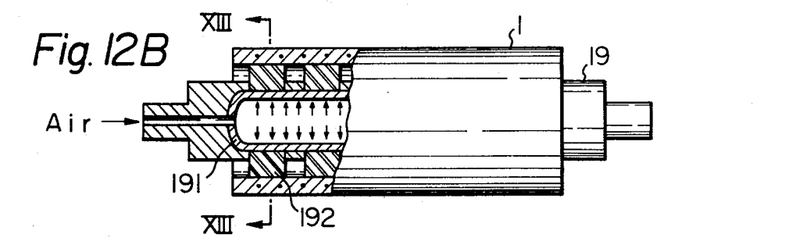

FIGS. 10 to 14 show various forms of the means for supporting the mandrel in a straight stiffened position in the step (2) above. These means must be constructed so as to support the mandrel 1 in a straight stiffened position during the step (3) for forming the fiber layers and to facilitate the forming of the fiber layers on the surface of the mandrel 1. For production of bent pipes of relatively small or medium diameters the means shown in FIGS. 10 to 12 are particularly effective.

The means shown in FIG. 10 is of the construction in which two round rods 17 of the diameter substantially equal to the inside diameter of the tubular mandrel 1 are inserted respectively from opposite ends of the mandrel 1 as shown in FIG. 10A and are bonded together at their opposite ends inside the mandrel 1 as shown in FIG. 10B. This construction is effective in the state shown in FIG. 10B for the forming of the fiber layers of the step (3) and in the state shown in FIG. 10A for the bending operation of the step (4).

The means shown in FIG. 11 is of the construction in which the mandrel 1 having any of the constructions shown in FIGS. 3 to 7 is held at opposite ends by chucks 18 having the conventional sealing function, and air, water or any other fluid is forced into the inside of the mandrel to thereby stiffen the mandrel 1 straight. This construction has an advantage that the bending operation of the step (4) is facilitated by discharging the fluid from the inside of the mandrel 1 or reducing the pressure thereof.

Figure 13:
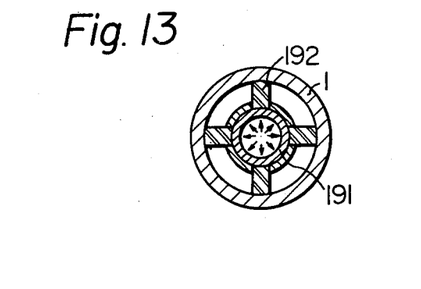
FIG. 13 is a cross-sectional view taken along the line XIII—XIII of FIG. 12B.

The means shown in FIGS. 12 and 13 is of the construction in which a commercially available air shaft 19 is utilized. The known air shaft 19 contains therewithin a rubber tube 191 and lugs 192 disposed radially about said rubber tube 191 as shown in FIG. 13 so that air is forced into the rubber tube 191 to expand it to thereby move the lugs 192 radially. In the normal condition where no air is supplied, the air shaft 19 is maintained at the reduced diameter and is easily inserted into the mandrel 1 as shown in FIG. 12A. When air is supplied into the air shaft 19, it is expanded in diameter and firmly engages with the inner surface of the mandrel 1. In this manner, the mandrel 1 is supported in a straight stiffened position by the air shaft 19. According to this construction, it is very easy to stiffen the mandrel 1 or to release the mandrel 1 from the straight stiffened condition.

While this air shaft is the most suitable for pipes of relatively small or medium diameter, it is available satisfactorily with the pipes of larger diameter as will be described hereinunder.

Figure 14A:
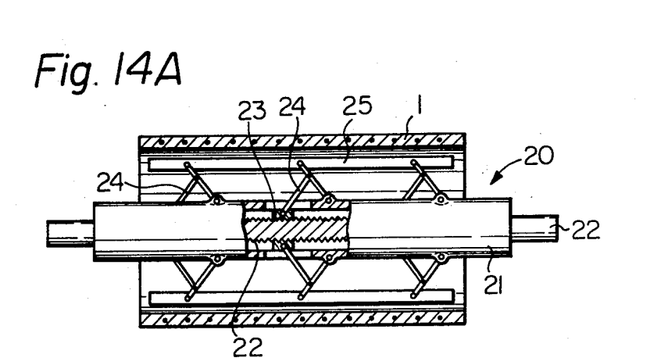
FIGS. 14A and 14B are partially broken away side views of an expanding mechanism for use in the stiffening support means of the mandrel.
Figure 14B:
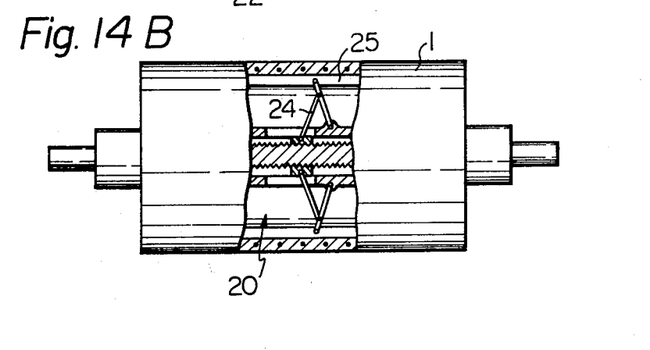

The means shown in FIG. 14 is particularly effective for producing bent pipes of relatively large diameter. This means is of the construction in which a conventional expanding mechanism 20 is utilized. This expanding mechanism 20 has the construction such that a threaded shaft 22 is inserted into a pipe 21 and supported within the pipe 21 by a nut 25, and a rocking link 24 is connected at an end with the pipe 21 and the nut 23 and at the other end with a pusher plate 25 so that rotation of the shaft 22 moves the pusher plate 25 radially. In the normal condition, the expanding mechanism 20 is maintained at the reduced diameter and is easily inserted into the mandrel 1 as shown in FIG. 14A. By rotation of the threaded shaft 22, the expanding mechanism 20 is expanded in diameter and the pusher plate 25 is brought into engagement with the inner surface of the mandrel 1 to thereby support the mandrel 1 in the straight stiffened position as shown in FIG. 14B.

In the step (3) for forming layers of fiber impregnated with thermo-hardening synthetic resin on the mandrel is used any of the known hand lay-up method, spray-up method, filament winding method, mat winding method and other similar methods. As the reinforcing material of the fiber layers is used any of the known glass fiber, synthetic fiber, asbestos, linen, and the like. As the thermo-hardening resin is used any of unsaturated polyester resin, epoxide resin, phenol formaldehyde resin, melanine formaldehyde resin, polyimido resin, and the like.

The step (4) above for releasing the mandrel from the straight stiffened position is effected by reversing the step (2) above. Namely, when the means shown in FIG. 10 is used, only the two round rods are required to be separated from each other and extracted from the mandrel (see FIG. 10A). When the means shown in FIG. 11 is used, only the fluid is exhausted from the inside of the mandrel or reduced in pressure. When the means shown in FIG. 12 is used, only the air shaft is required to be extracted from the mandrel after the fluid is exhausted or reduced in pressure. And when the means shown in FIG. 14 is used, only the expanding mechanism is required to be reduced in diameter and extracted from the mandrel.

The step (5) above for bending the mandrel having the fiber layers thereon in the required curvature is effected by the use of, for example, any of the mechanisms shown in FIGS. 15 to 20.

Figure 15A:
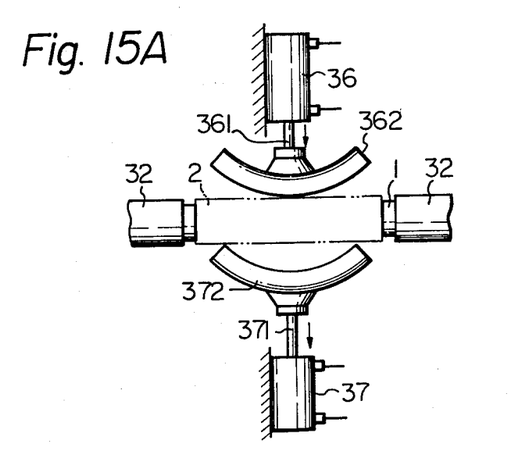
FIGS. 15A and 15B are front views of a device for use in the mandrel bending process.
Figure 15B:
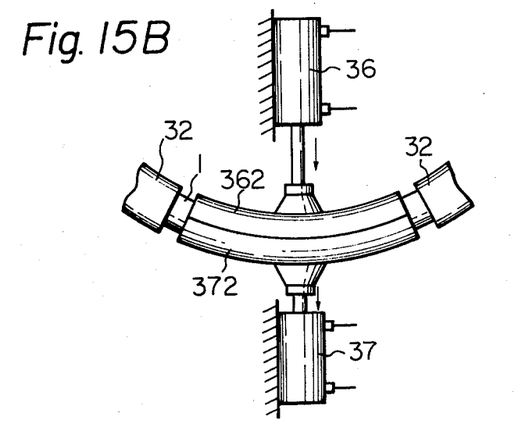

The mechanism shown in FIGS. 15A and 15B utilizes conventional chucks 32 to support opposite ends of the mandrel 1. The chucks 32 must be pivotable and slidable with respect to the support frame and have a fluid sealing function. A set of fluid cylinders 36 and 37 are fixed so as to be opposed to each other intermediate between a set of the chucks 32 and in a plane perpendicular to the horizontal line connecting the axes of said chucks. Piston rod 361 of the upper fluid cylinder 36 has a pusher mold 362 fixed thereto and piston rod 371 of the lower fluid cylinder 37 has a receiver mold 372 fixed thereto. The pusher and the receiver molds 362 and 372 are complementary halves of a configuration identical to that of the bent pipe to be produced split along the curved axis. The pusher and the receiver molds 362 and 372 have the inside diameters identical to the required inside diameter of the bent pipe to be produced and the radii of curvature identical to the required radius of curvature of the bent pipe to be produced.

Now, it is assumed that the layers 2 of glass fiber impregnated with a thermo-hardening synthetic resin have been formed by, for example, filament winding method on the mandrel 1 shown, for example, in FIG. 2 and the mandrel 1 is held at opposite ends by the chucks 32. Thus, after the glass fiber layers 2 have been formed on the mandrel 1 and before the synthetic resin begins to harden, the mandrel 1 is released from the straight stiffened position and the chucks 32 are released from positioning locks (not shown). Then, the fluid cylinders 36 and 37 are actuated to bend the mandrel 1 while holding the glass fiber layers 2 formed on the mandrel with the pusher and the receiver molds 362 and 372. During this bending operation, the chucks 32 are pivotally moved vertically downwardly while approaching each other to cause the mandrel 1 and the glass fiber layers 2 formed thereon to fit smoothly with the inside configuration of the pusher and the receiver molds 362 and 372 as shown in FIG. 15B. While maintaining this state, the pusher and the receiver molds 362 and 372 are heated. Then the synthetic resin is hardened and the desired bent pipe is formed. Reversal actuation of the fluid cylinders 36 and 37 causes the pusher and the receiver molds 362 and 372 to move back to the original positions.

Figure 16A:
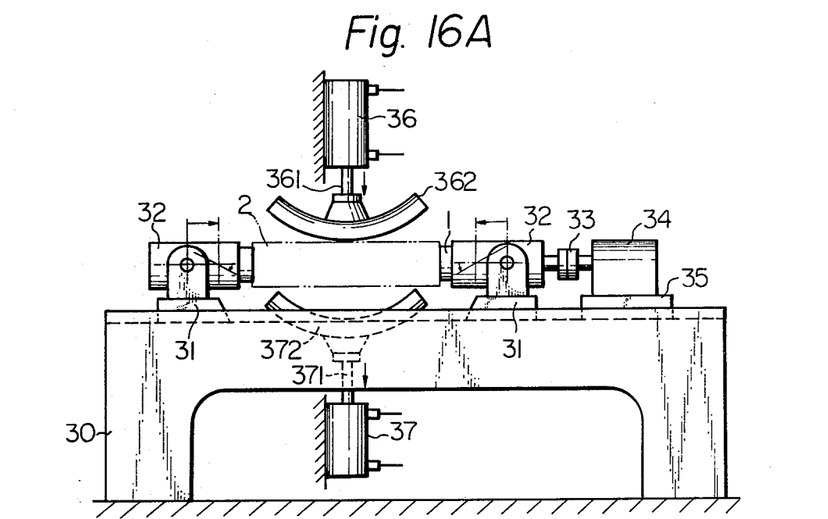
FIG. 16A is a front view of the entire apparatus and FIG. 16B is a front view of the essential portions of the apparatus in operation.
Figure 16B:
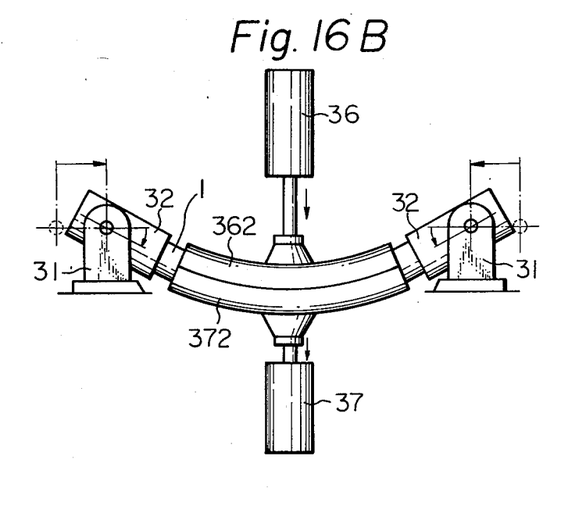

FIGS. 16 show an apparatus which is improved from the apparatus of FIG. 15 so as to effect the steps (1) to (5) in a through process. In this mechanism, the chucks 32 are mounted vertically pivotably on supports 31 slidable on a bed 30. The chucks 32 may be of a conventional type having a sealing function. One of the chucks 32 is connected to a conventional drive unit 34 through a conventional removable coupling 33. The rotary drive unit 34 is fixed to a support 35 slidable on the bed 30. A set of the fluid cylinders 36 and 37 are fixed so as to be opposed to each other intermediate between a set of the chucks 32 and in a plane perpendicular to the horizontal line connecting the axes of said chucks. The pusher mold 362 and the receiver mold 372 are provided in the same manner as described relating to FIG. 15.

Now, it is assumed that the mandrel 1 shown in FIG. 4 is used in the apparatus shown in FIG. 16. When the mandrel 1 is held at opposite ends by the chucks 32 and a suitable fluid is forced into the long holes 13 of the mandrel 1 (FIG. 4), the mandrel 1 is stiffened straight. Then, the rotary drive unit 34 is actuated and the layers 2 of glass fiber impregnated with a thermo-hardening synthetic resin is formed on the mandrel 1 by, for example, filament winding method.

After the glass fiber layers 2 have been formed on the mandrel 1 and before the synthetic resin begins to harden, the fluid is discharged from the mandrel 1 to release the mandrel from the straight stiffened position, the coupling 33 is removed, and the chucks 32 are released from positioning locks (not shown). Then, the fluid cylinders 36 and 37 are actuated to bend the mandrel 1 while holding the glass fiber layers 2 formed on the mandrel with the pusher and the receiver molds 362 and 372. During this bending operation, the chucks 32 are pivotally moved vertically downwardly while approaching each other to cause the mandrel 1 and the glass fiber layers 2 formed thereon to fit smoothly with the inside configuration of the pusher and the receiver molds 362 and 372 as shown in FIG. 16B. Thereafter, while maintaining this state, the pusher and the receiver molds 362 and 372 are heated to harden the synthetic resin. Thus a bent pipe is formed. Then, the fluid cylinders 36 and 37 are actuated in the reverse direction to cause the pusher and the receiver molds 362 and 372 to move back to the original positions.

The apparatuses shown in FIGS. 15 and 16 are suitable mainly for production of bent pipes of medium diameters and the apparatuses shown in FIGS. 17 to 20 are suitable mainly for production of bent pipes of medium or large diameters.

Figure 17A:
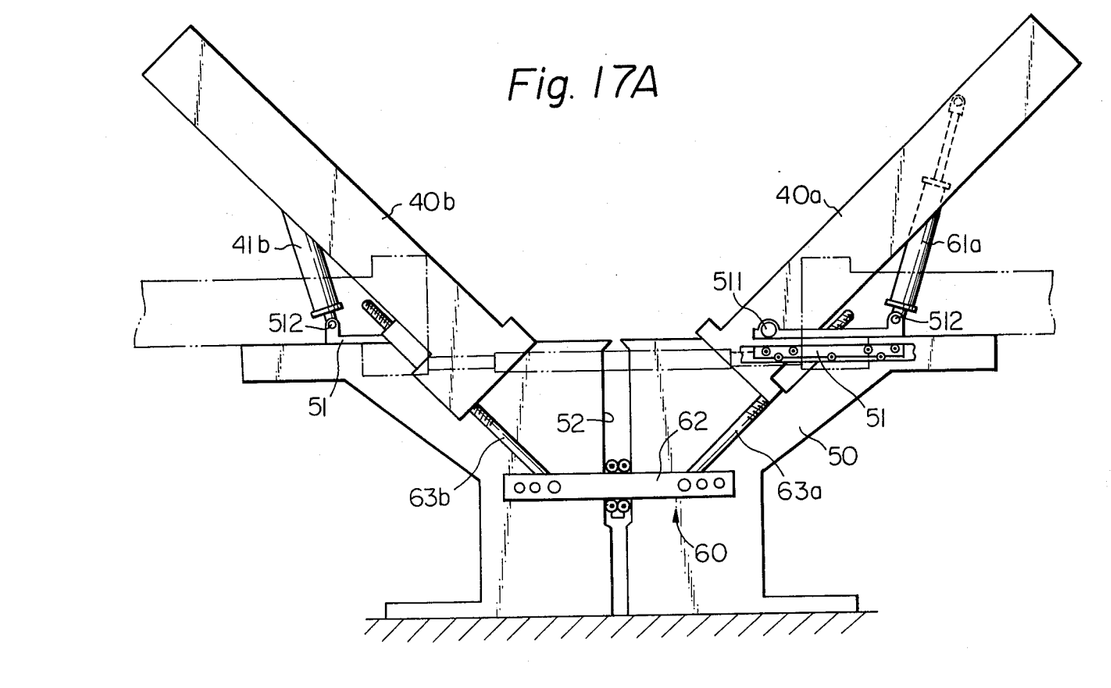
FIG. 17A is a front view of the entire apparatus in operation.
Figure 17B:
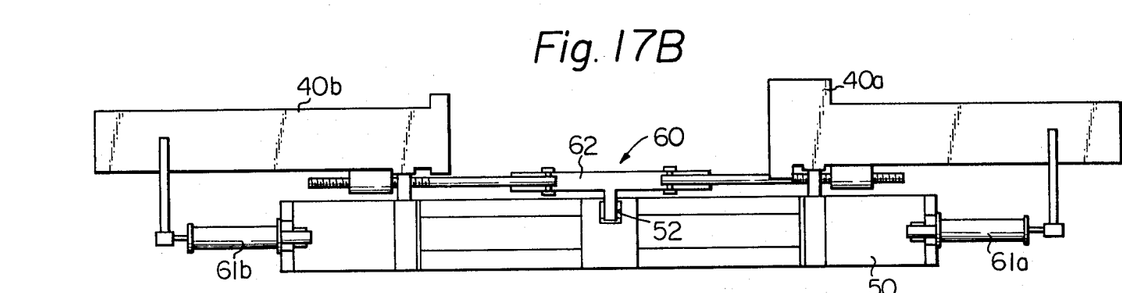
FIG. 17B is a plan view.

In the apparatus shown in FIGS. 17A and 17B, chuck units 40a and 40b containing therein chuck mechanisms and an expanding mechanism to be described in fuller detail hereinunder are disposed on a bed 50 opposite to each other and are connected to each other by a bending mechanism.

Figure 17C:
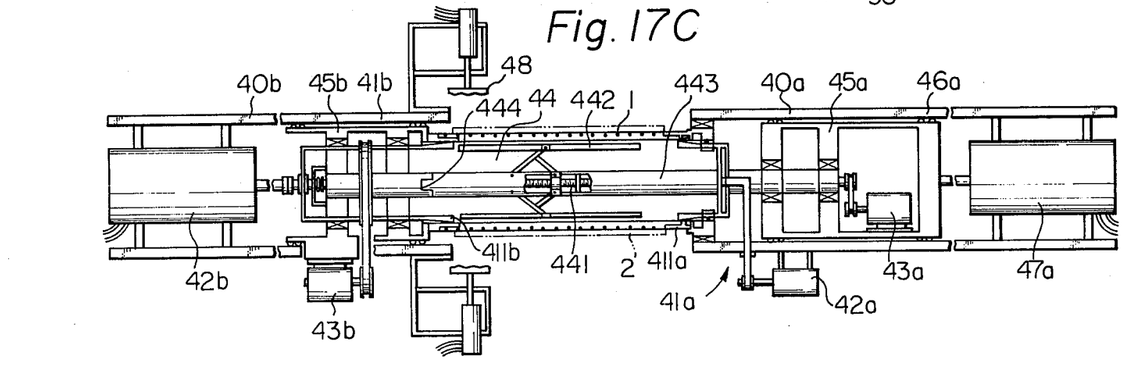
FIG. 17C is a longitudinal sectional view of the chuck unit of the apparatus.

The chuck units 40a and 40b are, as shown best in FIG. 17C, provided with chuck mechanisms 41a and 41b. Said chuck mechanisms 41a and 41b may be of a type having a function to catch as by claws the inner or outer surface of the ends of the mandrel 1. This embodiment is of the construction in which fluid cylinders 42a and 42b are actuated to move tapered claws 411a and 411b axially backwardly to thereby hold the inside surface of the ends of the mandrel. The chuck mechanism 41b is connected to a motor 43b. The chuck mechanisms 41a and 41b are mounted rotatably on the chuck unit bodies to be described hereinunder.

An expanding mechanism 44 is similar to the expanding mechanism 20 described hereinabove relating to FIG. 14. A threaded shaft 441 is connected to a motor 43a and actuation of the motor 43a causes a pusher plate 442 to move axially within the mandrel 1. The motor 43a is fixed to a support frame 45a which is mounted slidably axially within the body 46a of the chuck unit 40a. A fluid cylinder 47a fixed within the body 46a is connected to the support frame 45a so as to move it axially. A pipe 443 of an expanding mechanism 44 is connected at its intermediate portion 444 axially removably. The pipe 443 is mounted at its rightmost end rotatably to the support frame 45a while restrained against axial movement by the support frame 45a and mounted at its leftmost end similarly to the support frame 45b. The support frame 45b is of the construction similar to that of the support frame 45a and is connected to the fluid cylinder 42b to securely support the motor 43b and the chuck mechanism 41b.

As shown in FIG. 17C, the chuck unit 40b has a holding mechanism 48 attached thereto to hold a produced bent pipe upon extracting it from the molds as will be described hereinunder.

In order to facilitate, separation of the produced bent pipe from the mandrel upon extraction of the pipe from the molds the chuck mechanism 41b may be provided with a nozzle or nozzles for injecting a liquid or powder lubricant into a space between the produced bent pipe and the mandrel.

The chuck units 40a and 40b are, similarly to the chuck 32 described relating to FIGS. 15 and 16, mounted on the bed 50 axially movably and vertically pivotably and are connected to each other by means of a bending mechanism 60. As shown best in FIG. 17A, the chuck units 40a and 40b are slidable axially on the bed 50 by means of sliders 51 and are pivotable vertically with pivots 511 on the sliders 51 as fulcrums. In order to allow the chuck units 40a and 40b to pivotally move vertically with the pivots 511 as fulcrums, the fluid cylinders 61a and 61b are connected to the chuck units 40a and 40b, respectively. Namely, as shown in the drawings, piston rods of the fluid cylinders 61a and 61b are connected at tip ends thereof pivotably to the chuck units 40a and 40b, and the fluid cylinders 61a and 61b are connected at lowest ends thereof pivotably to the pivots 512 of the sliders 51.

In order to maintain the chuck units 40a and 40b equal to each other in slidable and pivotable movements, a connecting rod 62 is provided. The connecting rod 62 is connected to the chuck units 40a and 40b respectively through threaded rods 63a and 63b. The connecting rod 62 is movable upward and downward along a slot 50 provided in the bed 50.

The apparatus shown in FIGS. 17A to 17C are operated in the manner to be described below. First the mandrel 1 is held at the opposite ends by the chuck mechanisms 41a and 41b, and the expanding mechanism 44 is actuated to stiffen the mandrel 1 straight. Then the motor 43b is started to rotate the mandrel 1. After the fiber layers are formed as by filament winding method on the mandrel, the expanding mechanism 44 is released from operation and is extracted from the mandrel 1 by means of the fluid cylinder 47a. The expanding mechanism 44 is then received within the chuck unit 40a.

At this time, since the mandrel 1 is released from the straight stiffened condition, the bending mechanism 60 is actuated to bend the mandrel having the fiber layers thereon in the desired curvature.

After the synthetic resin is heat-hardened, one of the chuck mechanisms (41a) is released from operation and releases the righthand end of the mandrel 1 from holding, the holding mechanism 48 is actuated to hold the produced bent pipe at the lefthand end, and then the fluid cylinder 42b is actuated to extract only the mandrel 1 from the produced bent pipe. After separation of the pipe from the molds, the holding mechanism 48 is released from operation and the produced bent pipe is released.

Figure 17D:
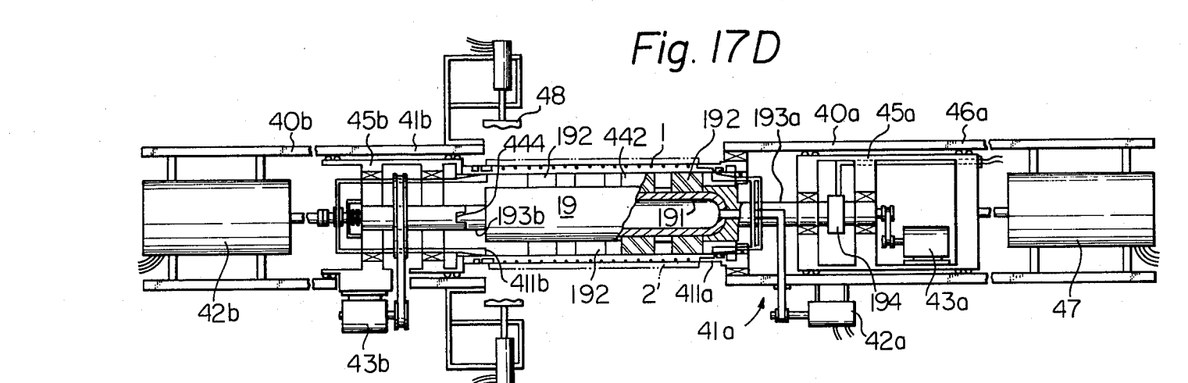
FIG. 17D is a longitudinal sectional view of another chuck unit of the apparatus.

While the chuck units 40a and 40b are shown in FIG. 17C to utilize the expanding mechanism 44, the air shaft 19 shown in FIG. 12 may be used in replacement of the expanding mechanism 44 as shown in the modified embodiment of FIG. 17D. In FIGS. 17C and 17D like parts are denoted by the same reference numerals. A journal 193b is connected to the left side of the air shaft 19 axially removably in the intermediate portion 444 thereof, and a journal 193a is mounted rotatably to the right side of the air shaft 19 with the rightmost end thereof restrained against axial movement by the support frame 45a. The right side journal 193a has attached in the intermediate portion thereof a conventional connector 194 for introducing the fluid under pressure into the air shaft 19. All in other respects, the apparatus shown in FIG. 17D has substantially the same construction as that shown in FIG. 17C.

Figure 18:
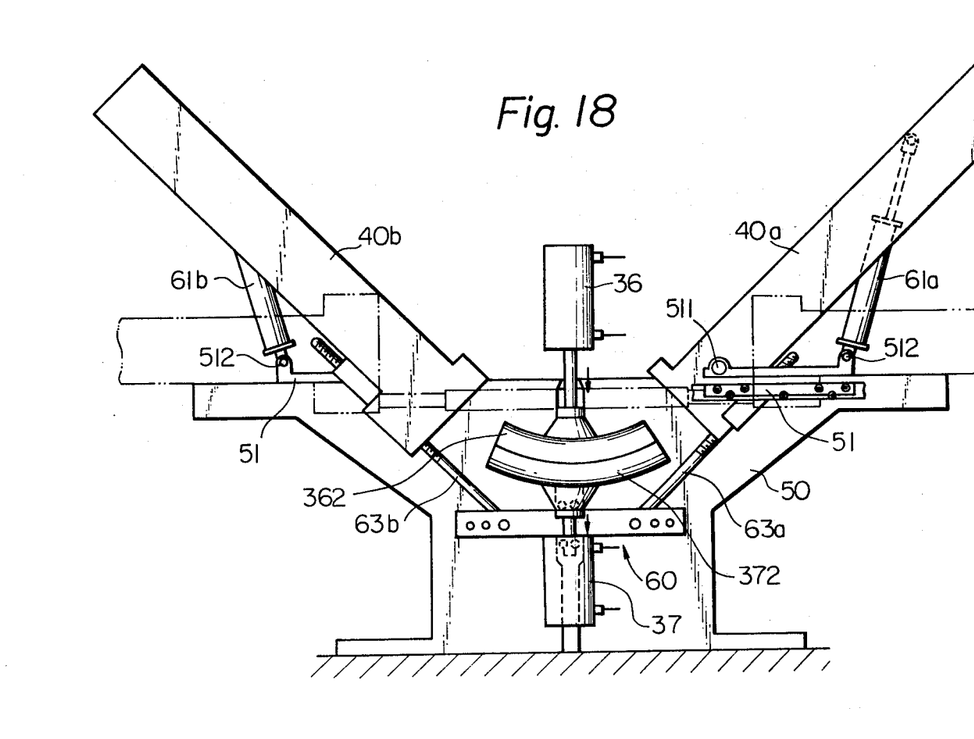
FIG. 18 is a front view of a modified form of the apparatus of FIG. 17.

FIG. 18 shows a modification having the construction in which the apparatus shown in FIGS. 17 is added with the bending mechanism shown in FIG. 15. The addition of the bending mechanism secures the precise and smooth bending operation of the mandrel.

Figure 19A:
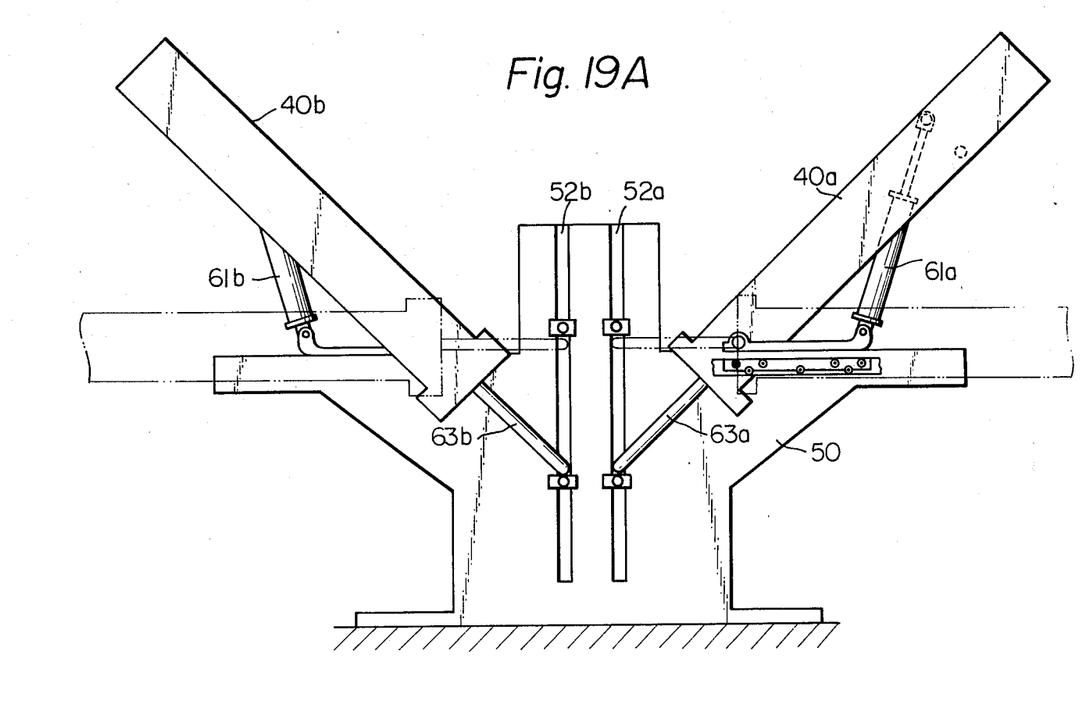
FIG. 19A is a front view of the apparatus in one mode of operation.
Figure 19B:
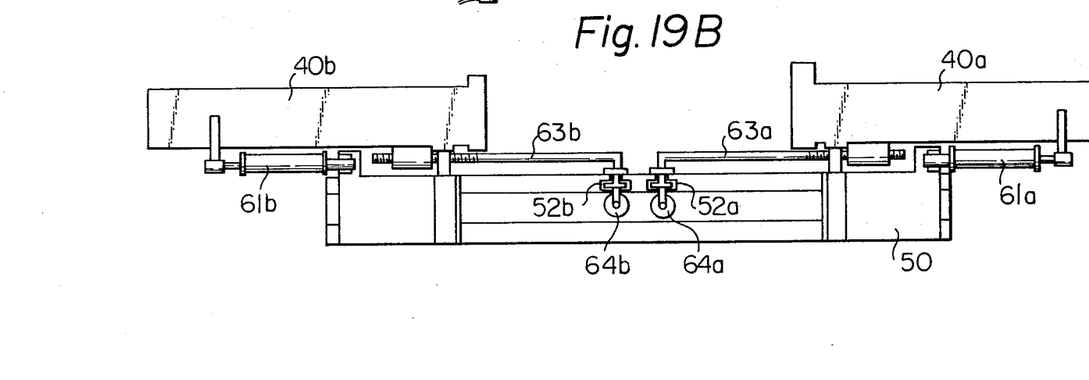
FIG. 19B is a front view.

FIGS. 19 show the construction and operation of a modification of the apparatus shown in FIG. 18. As shown in FIG. 19A, this modified apparatus has two vertical slots 52a and 52b in the bed 50 so that the threaded rods 63a and 63b are movable at the tip ends thereof independently from each other along the vertical slots 52a and 52b. For facilitating movements of the threaded rods 63a and 63b, the fluid cylinders 64a and 64b (see FIG. 19B) may be connected respectively to the tip ends of the threaded rods 63a and 63b.

Figure 19C:
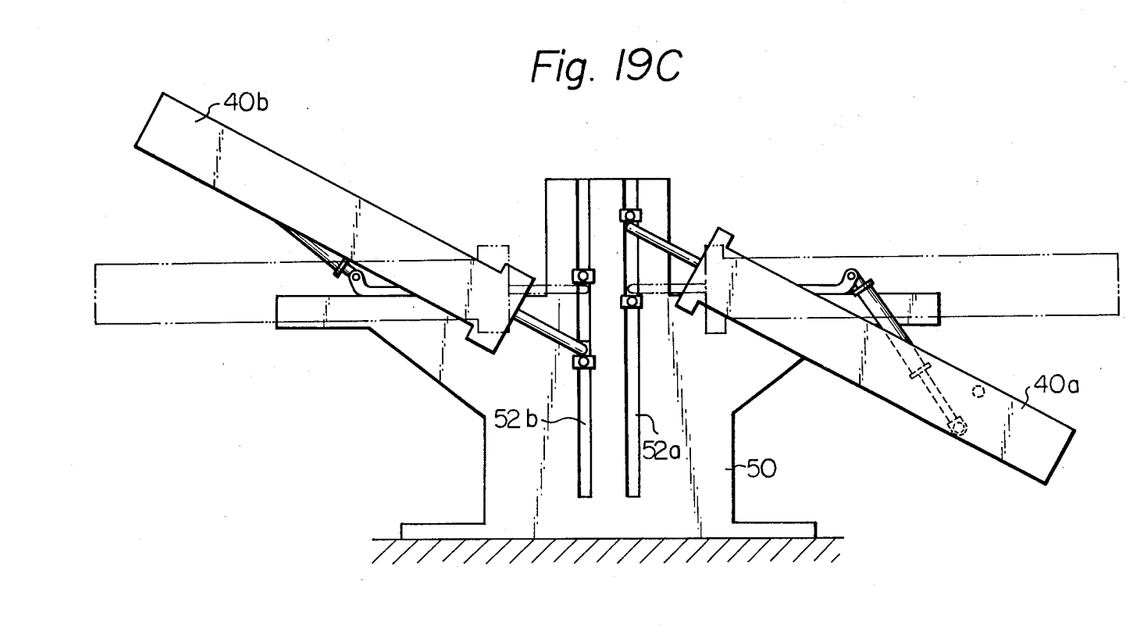
FIG. 19C is a front view of the apparatus in another mode of operation.

When the tip ends of the threaded rods 63a and 63b are moved, as shown in FIG. 19A, in the same direction respectively along the vertical slots 52a and 52b, an ordinary L-shaped bent pipe is produced, and when the tip ends of the threaded rods 63a and 63b are moved, as shown in FIG. 19C, in the opposite directions respectively along the vertical slots 52a and 52b, an S-shaped bent pipe is produced.

Figure 20:
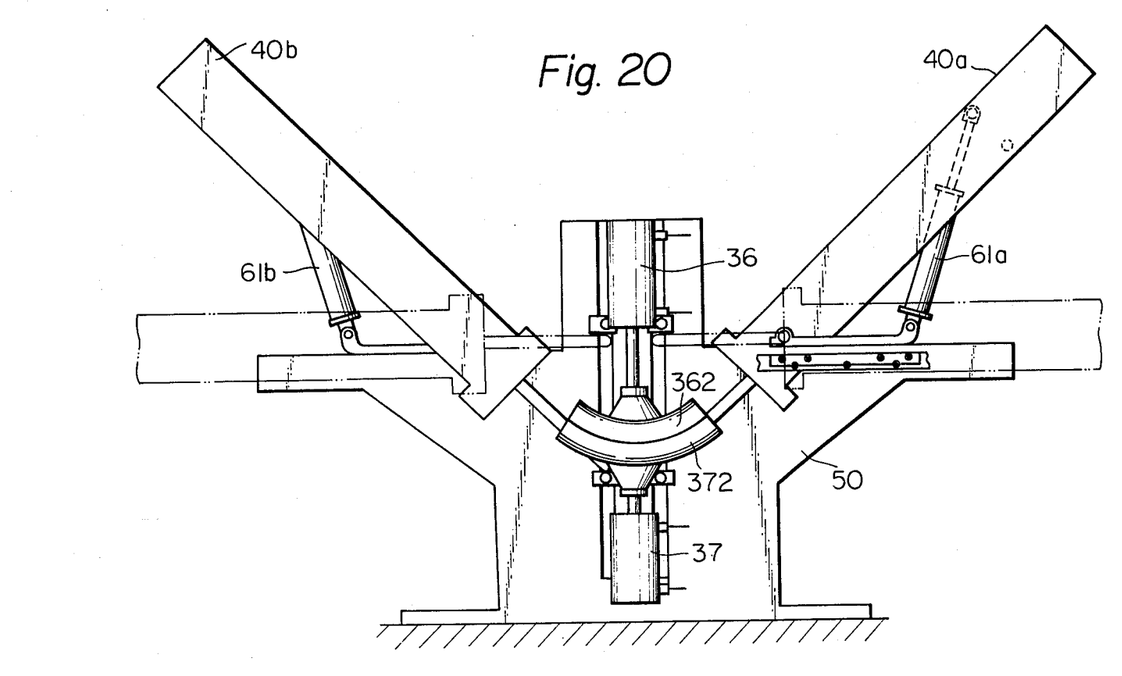
FIG. 20 is a front view of a modified form of the apparatus of FIGS. 19.

FIG. 20 shows a construction in which the apparatus shown in FIGS. 19 is added with the bending mechanism shown in FIG. 15. The addition of the bending mechanism, similarly in the apparatus shown in FIG. 18, secures the precise and smooth bending operation of the mandrel.

The step (6) above for heat-hardening the synthetic resin while maintaining the mandrel in the bent position is effected by any of the conventional means such as hot blasting, infrared irradiation, mold heating, and the like.

Lastly, the step (7) above for extracting the mandrel from the bent pipe thus hardened and formed is effected by a manual or mechanized operation. A bent pipe of a small diameter can be separated from the molds satisfactorily by a manual operation. For separation of a bent pipe of an intermediate or large diameter a mechanical force is required. For example, the mechanical separating means described relating to FIGS. 17 to 20, and the means for moving the chucks supporting the ends of the mandrel slightly backward to pull the mandrel and reducing the mandrel itself slightly in diameter, or the means for moving the chucks pivotally slightly in opposite directions to twist the mandrel itself slightly are effective. To further facilitate the separation of the pipe from the molds, it is preferred to inject a liquid or powder lubricant into the space between the mandrel and the produced bent pipe.

To make easy the separation of the produced bent pipe from the molds, it is also preferable to apply in advance a mold releasing agent such, for example, as well-known silicone wax, polyvinyl alcohol (PVA), vinyl chloride, and the like.

For using filament winding method in the automatic machine described hereinabove, it is preferred to removably mount flange members at the ends of the mandrel to arrange the end faces of the glass fiber layers even.

While the invention has been shown and described with respect to specific forms intended mainly to produce a simple bent pipe having only one bend, it will be very easy for those skilled in the art to produce various forms of bent pipes of, for example, S-shape, O-shape, M-shape, U-shape, and the like by selecting suitable molds and/or tools on the basis of the foregoing description.

As obvious from the foregoing, according to the present invention, it is made possible to produce bent pipes of reinforced synthetic resin very easily and in large quantities. Therefore, the present invention provides various industrial advantages such as wider use of conventional reinforced synthetic resin pipes and increase in demand thereof.

While I have shown and described specific embodiments of my invention, it will be understood that these embodiments are merely for the purposes of illustration and description and that various other forms may be devised within the scope of my invention, as defined in the appended claims.

I claim:

1. An apparatus for producing a bent pipe of reinforced synthetic resin, comprising:
   1. a mandrel formed of an elastic material into a tubular body;
   2. a set of chuck mechanisms, each of which is capable of holding an end of said mandrel fluidsealably and is mounted on a bed so as to be slidable axially and pivotable perpendicularly to the axial direction;
   3. a rotary drive unit removably connected to one of said chuck mechanisms for rotary driving said one chuck mechanism;
   4. a source of supply of a fluid, for supplying the fluid under pressure into said mandrel; and
   5. a mandrel bending mechanism including a pusher mold and a receiver mold disposed so as to be opposed to each other in a plane including the axis of said mandrel and a straight line perpendicular to said axis and with said axis therebetween, said pusher and receiver molds being complementary halves of a configuration identical to that of the bent pipe to be produced and functioning to hold said mandrel therebetween and to bend it.

2. An apparatus for producing a bent pipe of reinforced synthetic resin according to claim 1, in which said mandrel is provided internally at opposite ends with partitions defining a space therebetween for containing the fluid therewithin.

3. An apparatus for producing a bent pipe of reinforced synthetic resin according to claim 1, in which said mandrel has a plurality of axially extending long holes spaced circumferentially from each other in the tubular body for containing the fluid therewithin.

4. An apparatus for producing a bent pipe of reinforced synthetic resin according to claim 1, in which said mandrel has an axially and helically extending bent hole for containing the fluid therewithin.

5. An apparatus for producing a bent pipe of reinforced synthetic resin according to claim 1, in which said mandrel is provided at opposite ends with reinforcing rings.

6. An apparatus for producing a bent pipe of reinforced synthetic resin, comprising:
   1. a mandrel formed of an elastic material into a tubular body;
   2. a set of chuck units, each of which has a chuck mechanism for holding opposite ends of said mandrel and an expanding mechanism adapted to be inserted into the mandrel for pressingly support the inner surface of the mandrel, and is mounted on a bed so as to be slidable axially and pivotable perpendicularly to the axial direction; and
   3. a bending mechanism for sliding said set of chuck units axially and pivotally moving them vertically.

7. An apparatus for producing a bent pipe of reinforced synthetic resin according to claim 6, in which the expanding mechanism of the chuck unit utilizes an air shaft.

8. An apparatus for producing a bent pipe of reinforced synthetic resin according to claim 6, in which the expanding mechanism of the chuck unit is constructed such that a threaded pipe is inserted into a pipe and is supported within said pipe by a nut, an end of a rocking link is connected to said pipe and nut, and the other end of said rocking link is connected to a pusher plate so that said pusher plate is moved radially by rotating said shaft.

9. An apparatus for producing a bent pipe of reinforced synthetic resin according to claim 6, in which said bending mechanism is constructed to connect said set of chuck units to each other so as to cause the chuck units to slide over the equal lengths in the opposite directions and to pivotally move them over the equal lengths in the vertically opposite directions.

10. An apparatus for producing a bent pipe of reinforced synthetic resin according to claim 6, in which said bending mechanism further comprises a mandrel bending mechanism provided with a pusher mold and a receiver mold opposed to each other in a plane including the axis of the mandrel and a straight line perpendicular to said axis and with said axis therebetween, said pusher and receiver molds being complementary halves of a configuration identical to that of the bent pipe to be produced and functioning to hold said mandrel therebetween and to bend it.

11. An apparatus for producing a bent pipe of reinforced synthetic resin according to claim 6, in which said bending mechanism is constructed so as to cause said set of chuck units to slide independently in the axial directions and also to pivotally move in the vertical directions.

12. An apparatus for producing a bent pipe of reinforced synthetic resin according to claim 9, in which said bending mechanism further comprises a mandrel bending mechanism provided with a pusher mold and a receiver mold opposed to each other in a plane including the axis of the mandrel and a straight line perpendicular to said axis and with said axis therebetween, said pusher and receiver molds being complementary halves of a configuration identical to that of the bent pipe to be produced and functioning to hold said mandrel therebetween and to bend it.

* * * * *